US012623662B2

(12) United States Patent
Zhao et al.

(10) Patent No.: US 12,623,662 B2
(45) Date of Patent: May 12, 2026

(54) CONTROL METHOD OF MIXED TRAFFIC FLOW ON FREEWAY RAMP BASED ON CONTROLLABLE CONNECTED AND AUTONOMOUS VEHICLES (CAVs)

(71) Applicant: CHANG'AN UNIVERSITY, Xi'an (CN)

(72) Inventors: Xiangmo Zhao, Xi'an (CN); Ze Li, Xi'an (CN); Xia Wu, Xi'an (CN); Siyuan Gong, Xi'an (CN); Haigen Min, Xi'an (CN); Yihan Sun, Xi'an (CN); Kang Sun, Xi'an (CN); Wuqi Wang, Xi'an (CN); Guohui Zheng, Xi'an (CN); Wenjing Wang, Xi'an (CN); Yukun Ding, Xi'an (CN); Congli Zhang, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 290 days.

(21) Appl. No.: 18/461,285

(22) Filed: Sep. 5, 2023

(65) Prior Publication Data

US 2023/0415745 A1 Dec. 28, 2023

Related U.S. Application Data

(63) Continuation of application No. PCT/CN2023/074797, filed on Feb. 7, 2023.

(30) Foreign Application Priority Data

Sep. 23, 2022 (CN) .......................... 202211165614.6

(51) Int. Cl.
B60W 30/18 (2012.01)
B60W 30/14 (2006.01)
(Continued)

(52) U.S. Cl.
CPC .... B60W 30/18163 (2013.01); B60W 30/146 (2013.01); B60W 60/001 (2020.02);
(Continued)

(58) Field of Classification Search
CPC ......... B60W 30/18163; B60W 60/001; B60W 30/146; B60W 2520/00; B60W 2530/00; G08G 1/167; G08G 1/22
See application file for complete search history.

(56) References Cited

U.S. PATENT DOCUMENTS

2010/0256852 A1* 10/2010 Mudalige ............... G08G 1/163
701/24
2018/0188745 A1* 7/2018 Pilkington ............... G08G 1/22
(Continued)

FOREIGN PATENT DOCUMENTS

CN 104464317 A 3/2015
CN 108538069 A 9/2018
(Continued)

*Primary Examiner* — Jelani A Smith
*Assistant Examiner* — Gabriel Anfinrud

(57) ABSTRACT

A control method of mixed traffic flow on freeway ramp based on controllable connected and autonomous vehicles (CAVs) is provided. A ramp is divided into a normal driving section, a vehicle platoon formation section and an accelerating and merging section. A vehicle platoon is formed by a leading CAV and human-driven vehicles (HDVs). Time interval $[t_{min}, t_{max}]$ for the vehicle platoon to completely reach the merging point S is calculated. CAVs on the main lane and ramp are cooperatively controlled, and a merging gap is reserved for the ramp vehicle platoon. The vehicle platoon is allowed to accelerate and merge into the main lane. By means of the Internet-of-Vehicle (IoV) technology, the traffic situation on the main lane and downstream merging zone can be obtained in advance, and speeds of the CAVs are cooperatively controlled to lead the ramp vehicles to safely merge into the main lane.

9 Claims, 5 Drawing Sheets

(51) Int. Cl.
  _B60W 60/00_     (2020.01)
  _G08G 1/00_     (2006.01)
  _G08G 1/16_     (2006.01)
(52) U.S. Cl.
  CPC ............... _G08G 1/167_ (2013.01); _G08G 1/22_
      (2013.01); _B60W 2520/00_ (2013.01); _B60W_
                      _2530/00_ (2013.01)

(56)          References Cited

U.S. PATENT DOCUMENTS

| | | |
|---|---|---|
| 2019/0347931 A1 | 11/2019 | Ding et al. |
| 2021/0256851 A1* | 8/2021 | Uenoyama ....... G08G 1/096741 |
| 2022/0351625 A1* | 11/2022 | Qi ....................... B60W 30/165 |

FOREIGN PATENT DOCUMENTS

| | | |
|---|---|---|
| CN | 108986471 A | 12/2018 |
| CN | 110930697 A | 3/2020 |
| CN | 111369813 A | 7/2020 |
| CN | 111599194 A | 8/2020 |
| CN | 112614340 A | 4/2021 |
| CN | 114067559 A | 2/2022 |
| CN | 114664078 A | 6/2022 |
| CN | 114708734 A | 7/2022 |
| CN | 114973666 A | 8/2022 |
| CN | 114999152 A | 9/2022 |
| WO | 2010103504 A1 | 9/2010 |

* cited by examiner

CONTROL METHOD OF MIXED TRAFFIC FLOW ON FREEWAY RAMP BASED ON CONTROLLABLE CONNECTED AND AUTONOMOUS VEHICLES (CAVs)

CROSS-REFERENCE TO RELATED APPLICATIONS

This application is a continuation of International Patent Application No. PCT/CN2023/074797, filed on Feb. 7, 2023, which claims the benefit of priority from Chinese Patent Application No. 202211165614.6, filed on Sep. 23, 2022. The content of the aforementioned applications, including any intervening amendments thereto, are incorporated herein by reference.

TECHNICAL FIELD

This application relates to intelligent transportation, in particular to a control method of mixed traffic flow on freeway ramp based on controllable connected and autonomous vehicles.

BACKGROUND

With the development of fifth-generation (5G) communication technology, Internet-of-Vehicle (IoV) technology, intelligent vehicles and roadside equipment, connected and autonomous vehicles (CAVs) are emerging. The precision and effectiveness of control strategies can be greatly improved based on the precise perception, trafficability and control performance of CAVs. Meanwhile, the CAVs can also avoid the negative impact of randomness and uncertainty of driving behaviors of traditional human-driven vehicles (HDVs) on the operation of traffic system.

As the freeway junction, the ramp merging zone often suffers serious traffic jam and traffic accidents owing to the frequent lane-changing behavior and large randomness of driving behavior. In the case of heavy main lane traffic flow, if the ramp vehicles cannot find an acceptable merging gap, it will lead to the mandatory lane-changing behavior of main lane vehicles, which will further aggravate traffic jam in the merging zone.

The existing control methods for traffic flow on freeway ramp are predominated by signal light control. However, in view of the complex traffic scene at the freeway junction, it is difficult to deal with the complex traffic flow in the ramp merging zone through the single signal timing control. Besides, the control of the CAVs is also difficult in the mixed traffic flow control on the ramp. The unreasonable speed control of the CAVs will aggravate the traffic jam on the downstream section of the freeway.

SUMMARY

In view of the defects in the existing control strategies for traffic jam at the ramp merging zone of the freeway, the present disclosure provides a control method of mixed traffic flow on freeway ramp based on controllable connected and autonomous vehicles (CAVs).

Technical solutions of the present disclosure are described as follows.

This application provides a control method of mixed traffic flow on freeway ramp based on controllable CAVs, comprising:

(S1) dividing a ramp into a normal driving section, a vehicle platoon formation section and an accelerating and merging section; and marking a leading vehicle determination point A, a vehicle platoon formation completion point B and a merging point S on the ramp;

(S2) forming a vehicle platoon consisting of a leading CAV and at least one human-driven vehicle (HDV) on the vehicle platoon formation section;

(S3) calculating a time interval [$t_{min}$, $t_{max}$] for the vehicle platoon to fully reach the merging point S;

(S4) performing cooperative control between a CAV on a main lane and the leading CAV on the ramp to provide a merging gap for the vehicle platoon on the ramp; and (S5) allowing the vehicle platoon to accelerate and merge into the main lane.

In some embodiments, in step (S2), when the vehicle platoon is formed by two vehicles in an extreme scenario, a positional relationship between the leading CAV and an immediately-following HDV is expressed as:

$$L_A + \int_0^\tau v_{leading\_cav}(t)dt = \int_0^\tau v_{follower}(t)dt + L_H;$$

wherein: $L_A$ represents a position of the leading vehicle determination point A;

$v_{leading\_cav}(t)$ represents a speed of the leading vehicle at time t;

$v_{follower}(t)$ represents a speed of the immediately-following HDV at the time t; and $L_H$ represents a vehicle car-following distance within the vehicle platoon.

In some embodiments, in step (S3), the time interval [$t_{min}$, $t_{max}$] when the vehicle platoon completely passes the merging point is calculated as follows: calculating a minimum speed and a maximum speed of the leading CAV on the ramp; calculating a time when the leading CAV on the ramp reaches the merging point S, and calculating a time when the last HDV of the vehicle platoon reaches the merging point S; and calculating the time interval [$t_{min}$, $t_{max}$] for the vehicle platoon to completely pass the merging point S based on the time when the last HDV in the vehicle platoon reaches the merging point S.

In some embodiments, a speed of the vehicles on the ramp satisfies the following conditions:

$$L_A + v_{min}t = v_{max}t + L_H; \text{ and } v_{min}t = L_B - L_A;$$

wherein: $v_{min}$ represents a minimum speed of the vehicles on the ramp;

$v_{max}$ represents a maximum speed of the vehicles on the ramp;

$L_B$ represents a position of the vehicle platoon formation completion point B; and t represents a travel time of the vehicles on the ramp.

In some embodiments, the time when the leading CAV on the ramp reaches the merging point S is calculated according to an actual vehicle platoon formation completion point B';

case 1: when the actual vehicle platoon formation completion point B' coincides with the vehicle platoon formation completion point B marked on the ramp, the time $t_{cav\_to\_S}$ when the leading CAV on the ramp reaches the merging point S is expressed as:

$$\frac{L_S - L_B - \dfrac{v_{max}^2 - v_{min}^2}{2a_{cav1}}}{v_{max}} + \frac{v_{max} - v_{min}}{a_{cav1}} = t_{cav\_to\_S};$$

and case 2: when the actual vehicle platoon formation comple-
tion point B' is located between the leading vehicle
determination point A and the vehicle platoon forma-
tion completion point B, the time $t_{cav\_to\_S}$ when the
leading CAV reaches the merging point S is expressed
as:

$$\frac{L_s - L_{Current\_LeadingCav\_Pos} - \dfrac{v_{max}^2 - v_{min}^2}{2a_{cav1}}}{v_{max}} + \frac{v_{max} - v_{min}}{a_{cav1}} = t_{cav\_to\_s};$$

wherein: $L_B$ represents a position of the vehicle platoon
formation completion point B on the ramp;

$L_S$ represents a position of the merging point S on the
ramp;

$\alpha_{cav1}$ represents an acceleration of the leading CAV; and $L_{Current\_LeadingCav\_Pos}$ represents a position of the leading
CAV on the ramp when the vehicle platoon is success-
fully formed.

In some embodiments, the time when the last HDV of the
vehicle platoon reaches the merging point S is calculated
based on a Newell car-following model, expressed as:

$$t_n = t_{cav\_to\_S} + \left( \sum_{i=2}^{n} \left( \tau_n + \frac{d_n}{v_{max}} \right) \right);$$

wherein: $\tau_n$ represents a response time of a $n^{th}$ HDV of the
vehicle platoon;

$d_n$ represents a minimum following distance of the $n^{th}$
HDV of the vehicle platoon; and n represents the $n^{th}$ vehicle of the vehicle platoon, and
$n \neq 1$.

In some embodiments, regarding the time interval $[t_{min},
t_{max}]$, $t_{min}$ represents a minimum time required for the last
HDV of the vehicle platoon to reach the merging point S
when the vehicle platoon is successfully formed, and is
calculated as:

$$t_{min} = \begin{cases} \dfrac{(N-1)(L_H + l) + L_S - L_B}{v_{max}} & (case1,\ L_B = L_{B'}) \\[2ex] \dfrac{(N-1)(L_H + l) + L_S - L_{B'}}{v_{max}} & (case2,\ L_B \neq L_{B'}) \end{cases};$$

$t_{max}$ represents maximum time required for the last HDV
of the vehicle platoon to reach the merging point S
when the vehicle platoon is successfully formed, and is
calculated as:

$$t_{max} = \begin{cases} \dfrac{(N-1)(L_H + l) + L_S - L_B}{v_{min}} & (case1,\ L_B = L_{B'}) \\[2ex] \dfrac{(N-1)(L_H + l) + L_S - L_{B'}}{v_{min}} & (case2,\ L_B \neq L_{B'}) \end{cases};$$

wherein: $L_B$ represents a position of the vehicle platoon
formation completion point B on the ramp;

$L_S$ represents a position of the merging point S on the
ramp;

N represents the number of vehicles in the vehicle platoon
on the ramp; and l represents a length of vehicles.

In some embodiments, in step (S4), when a position of the
CAV on the main lane is within a range
$[M_S\text{-}v_{mainlane\_max}t_{max},\ M_S\text{-}v_{mainlane\_max}t_{min}]$; a speed of the
CAV on the main lane is adjusted to provide a safe merging
gap for the vehicle platoon on the ramp, wherein
$v_{mainlane\_max}$ represents a maximum speed limit for the main
lane, and $M_S$ represents a distance from a starting point of
the main lane to the merging point S.

In some embodiments, in step (S4), the speed $v_{mainlane\_cav}$
of the cooperative control CAV on the main lane is
expressed as:

$$L_{mainlane\_cav} + \int_{0}^{t_N} v_{mainlane\_cav}(t)dt < M_S;$$

wherein: $L_{mainlane\_cav}$ represents a position of the coop-
erative control CAV on the main lane when the vehicle
platoon is successfully formed on the ramp;

$t_N$ represents time required for a last vehicle in the vehicle
platoon to travel to the merging point S when the
vehicle platoon is successfully formed; and $v_{mainlane\_cav}(t)$ represents a speed of the cooperative con-
trol CAV on the main lane at the time t.

In some embodiments, in step (S4), on the main lane, a
distance $L_{mainlane\_cav\_followdist}$ between the cooperative con-
trol CAV and its preceding vehicle is expressed as:

$$L_{mainlane\_cav\_followdist} > (N-1)L_H + N \cdot l;$$

wherein: N represents the number of vehicles in the
vehicle platoon on the ramp;

$L_H$ represents a vehicle car-following distance within the
vehicle platoon; and l represents a length of vehicles.

Compared to the prior art, the present disclosure has the
following beneficial effects.

The control method of mixed traffic flow on freeway ramp
based on controllable connected and autonomous vehicles,
starts from the situation of freeway ramp control, combines
the traffic flow model and the vehicle kinematical model,
aims at controllability of safe merging of mixed traffic flow
on freeway ramp, and is based on the idea that the CAV leads
the ramp vehicle platoon to merge into the main lane. Firstly,
a ramp is divided into sections, and the vehicle platoon
formation condition on the ramp is analyzed under the
precondition that the CAV on the ramp is controllable. By
predicting the required time for vehicle platoon arriving at
the merging point, utilizing the collaboratively controlled
CAV on the main lane to reserve the merging gap for vehicle
platoon so that the vehicles on the ramp can merge into the
main lane safely.

When the leading CAV and its following HDVs success-
fully form the platoon, it is firstly required to determine
whether there are CAVs that can be cooperatively controlled
in the corresponding position interval on the upstream of the
main lane according to the time interval when the vehicle
platoon arrives at the merging point S, if so, it is feasible to
control the speed of a corresponding CAV on the main lane to ensure that there is a safe gap for the vehicle platoon of ramp to merge into the main lane. In summary, by means of the cooperative control of the CAV on the main lane and the CAV on the ramp, the vehicles on the ramp can be safely controlled to merge into the main lane.

The control method provided herein is applicable to different types of freeway ramps. It can effectively ensure the safe and controllable merging of ramp vehicles into the main lane in the case of both balanced and unbalanced on-ramp traffic flow.

DETAILED DESCRIPTION OF EMBODIMENTS

The present disclosure will be further described below with reference to the embodiments, which are merely illustrative of this application rather than a limitation to this application.

Figure 1:
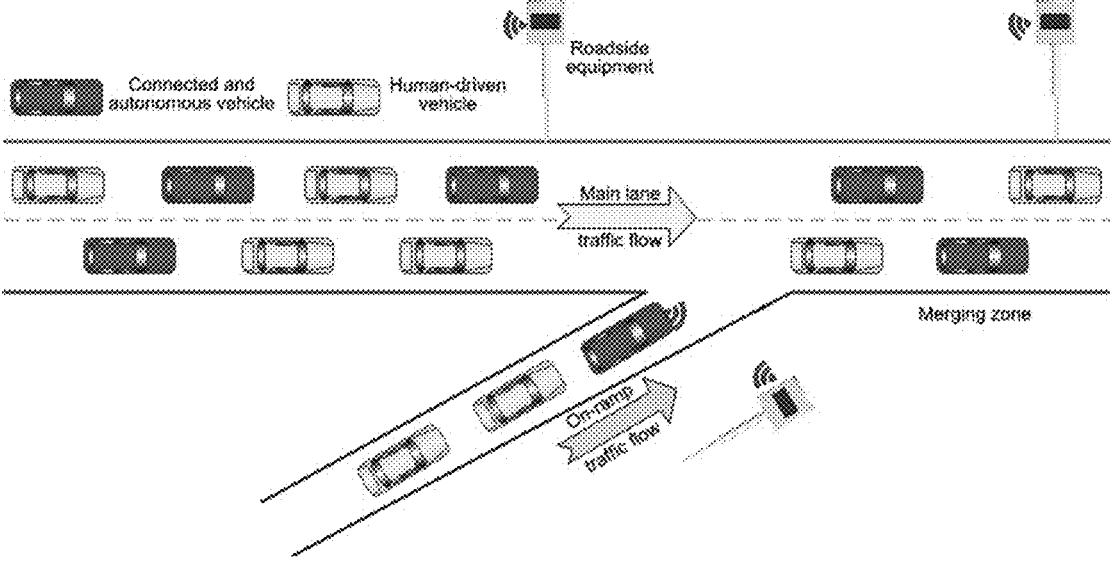
FIG. 1 schematically shows a freeway traffic scene according to an embodiment of the present disclosure.
Figure 2:
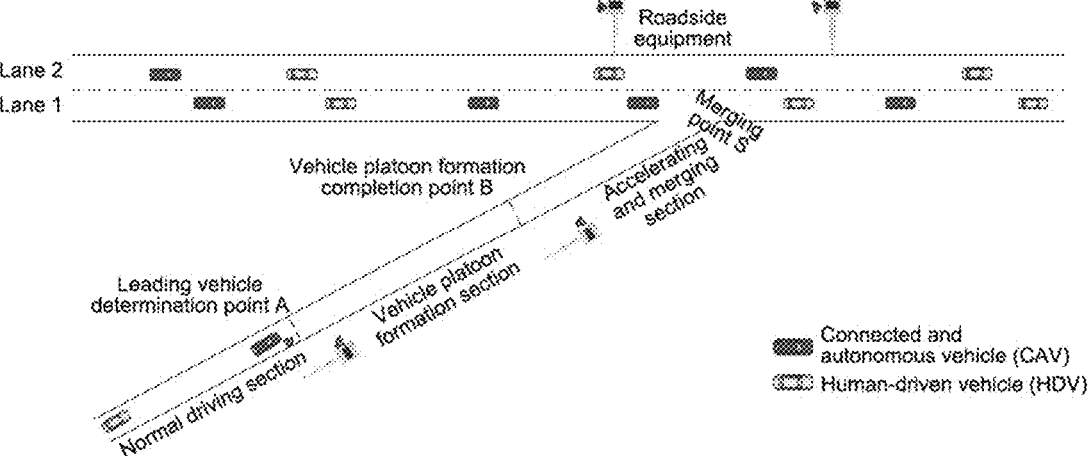
FIG. 2 schematically shows the analysis of formation conditions of vehicle platoon on the ramp according to an embodiment of the present disclosure.

This application provides a control method of mixed traffic flow on freeway ramp based on controllable connected and autonomous vehicles (CAVs), which includes the following steps:

(S1) Referring to FIGS. 1-2, the ramp is divided into a normal driving section, a vehicle platoon formation section and an accelerating and merging section, and a leading vehicle determination point A, a vehicle platoon formation completion point B, and a merging point S are marked on the ramp. The position of the leading vehicle determination point A is $L_A$; $L_B$ represents the position of the vehicle platoon formation completion point B, $L_S$ represents the position of the merging point S on the ramp, $M_S$ represents the position of the merging point S on the main lane.

(S2) A leading CAV and at least one HDV form a vehicle platoon on the vehicle platoon formation section.

When the vehicle platoon is formed by two vehicles in an extreme scenario, a positional relationship between the leading CAV and the immediately-following HDV is expressed as:

$$L_A + \int_0^t v_{leading\_cav}(t)dt = \int_0^t v_{follower}(t)dt + L_H;$$

where $L_A$ represents the position of the leading vehicle determination point A;

$v_{leading\_cav}(t)$ represents a speed of the leading CAV at time t;

$v_{follower}(t)$ represents a speed of the immediately-following HDV at time t;

$L_H$ represents a vehicle car-following distance within the vehicle platoon.

When the actual vehicle platoon formation completion point B' coincides with the vehicle platoon formation completion point B marked on the ramp, the positional relationship between the leading CAV and the immediately-following HDV is expressed as:

$$L_A + \frac{v_{A\_cav}^2 - v_{min}^2}{2a_{cav2}} + v_{min}t_1 = \frac{v_{max}^2}{2a_{hdv1}} + v_{max}t_2 + \frac{v_{max}^2 - v_{min}^2}{2a_{hdv2}} + L_H;$$

where $v_{A\_cav}$ represents a speed of the leading CAV when arriving at the leading vehicle determination point A;

$a_{cav2}$ represents a deceleration of the leading CAV;

$a_{dv1}$ represents an acceleration of the immediately-following HDV;

$a_{dv2}$ represents a deceleration of the immediately-following HDV;

$t_1$ represents a travel time of the leading CAV at a constant speed;

$t_2$ represents a travel time of the immediately-following HDV at a constant speed.

(S3) A time interval $[t_{min}, t_{max}]$ (owing to the difference in speeds of the vehicles in the vehicle platoon) for the vehicle platoon to completely arrive at the merging point S is calculated as follows.

(S31) Firstly, a minimum speed of the vehicles on the ramp is calculated.

When the acceleration and deceleration process of the leading CAV and the immediately-following HDV are not considered, the speed of the leading CAV on the ramp is expressed as:

$$L_A + v_{min}t = v_{max}t + L_H; \text{ and } v_{min}t = L_B - L_A;$$

where $v_{min}$ represents the minimum speed of the vehicles on the ramp;

$v_{max}$ represents the maximum speed of the vehicles on the ramp, where the vehicles refer to the CAV and the HDVs;

$L_B$ represents the position of the vehicle platoon formation completion point B;

t represents the travel time of vehicles on the ramp.

(S32) The time when the leading CAV reaches the merging point S and the time when the last HDV of the vehicle platoon reaches the merging point S are calculated respectively.

Figure 3:
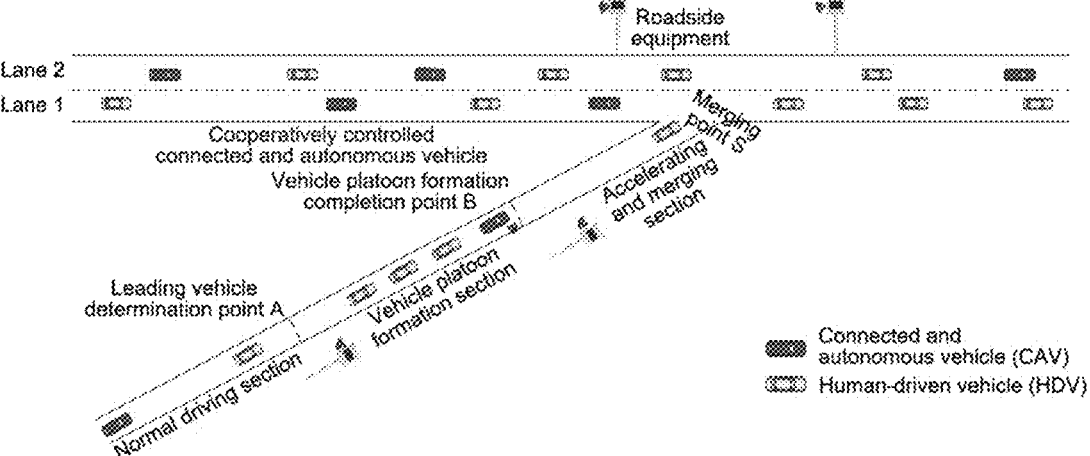
FIG. 3 schematically shows the case 1 when the vehicle platoon is formed according to an embodiment of the present disclosure.
Figure 4:
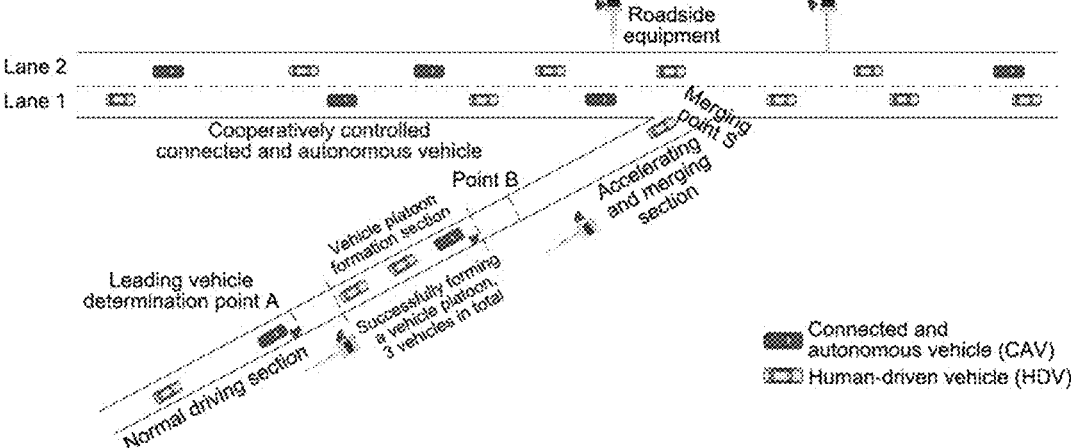
FIG. 4 schematically shows the case 2 when the vehicle platoon is formed according to an embodiment of the present disclosure.

Calculating the time when the leading CAV arrives at the merging point S according to the actual vehicle platoon formation completion point B':

case 1: according to FIG. 3, when the actual vehicle platoon formation point B' coincides with the vehicle platoon formation completion point B marked on the ramp, the time $t_{cav\_to\_s}$ when the leading CAV reaches the merging point S is expressed as:

$$\frac{L_S - L_B - \frac{v_{max}^2 - v_{min}^2}{2a_{cav1}}}{v_{max}} + \frac{v_{max} - v_{min}}{a_{cav1}} = t_{cav\_to\_S};$$

and case 2: according to FIG. 4, when the actual vehicle platoon formation completion point B' is located between the leading vehicle determination point A and the vehicle platoon formation completion point B, the time $t_{cav\_to\_s}$ when the leading CAV reaches the merging point S is expressed as:

$$\frac{L_S - L_{Current\_LeadingCav\_Pos} - \frac{v_{max}^2 - v_{min}^2}{2a_{cav1}}}{v_{max}} + \frac{v_{max} - v_{min}}{a_{cav1}} = t_{cav\_to\_S}$$

where $L_B$ represents the position of the vehicle platoon formation completion point B on the ramp;

$L_S$ represents a position of the merging point S on the ramp;

$\alpha_{cav1}$ represents an acceleration of the leading CAV; and $L_{Current\_LeadingCav\_Pos}$ represents a position of the leading CAV on the ramp when the vehicle platoon is successfully formed.

The time when the last HDV of the vehicle platoon reaches the merging point S is calculated based on the Newell car-following model, expressed as:

$$t_n = t_{cav\_to\_S} + \sum_{i=2}^{n}\left(\tau_n + \frac{d_n}{v_{max}}\right);$$

where $\tau_n$ represents a response time of the $n^{th}$ HDV of the vehicle platoon;

$d_n$ represents a minimum following distance of the $n^{th}$ HDV of the vehicle platoon; and n represents the $n^{th}$ vehicle of the vehicle platoon, and $n \neq 1$.

(S33) Finally, calculating a time interval of vehicle platoon completely arriving at merging point S:

$[t_{min}, t_{max}]$ represents the time interval of vehicle platoon completely arriving at the merging point S, where it is assumed that a distance of two adjacent vehicles in the vehicle formation is the same, tmin represents a minimum time required for the last HDV of the vehicle platoon to reach the merging point S when the vehicle platoon is successfully formed, and is calculated as:

$$t_{min} = \begin{cases} \frac{(N-1)(L_H + l) + L_S - L_B}{v_{max}} & (case1, L_B = L_{B'}) \\ \frac{(N-1)(L_H + l) + L_S - L_{B'}}{v_{max}} & (case2, L_B \neq L_{B'}) \end{cases};$$

$t_{max}$ represents maximum time, and is calculated as:

$$t_{max} = \begin{cases} \frac{(N-1)(L_H + l) + L_S - L_B}{v_{min}} & (case1, L_B = L_{B'}) \\ \frac{(N-1)(L_H + l) + L_S - L_{B'}}{v_{min}} & (case2, L_B \neq L_{B'}) \end{cases};$$

where $L_B$ represents a position of the vehicle platoon formation completion point B on the ramp;

$L_S$ represents a position of the merging point S on the ramp;

N represents the number of vehicles in the vehicle platoon on the ramp;

$L_H$ represents a vehicle car-following distance within the vehicle platoon; and l represents a length of vehicles.

N represents the number of vehicles in the vehicle platoon and is calculated by the collaborative calculation of CAVs and roadside equipment. The specific algorithm steps are as follows:

Step (1), referring to FIG. 2, when a vehicle travels to the leading vehicle determination point A, the roadside equipment first determines its vehicle type. If the vehicle is a CAV, determining it as the leading vehicle and executing step (2); if the vehicle is a HDV, executing step (3).

Step (2), judging whether there are other leading CAVs in the vehicle platoon formation section at this time, if so, the first leading CAV in the vehicle platoon formation section and its rear vehicles automatically form platoon successfully. At this time, N=Count represents the number of vehicles in the current vehicle platoon, and the value of Count is determined by the vehicle counter at point A during the vehicle platoon forming period. After obtaining the number of vehicles of previous vehicle platoon N, reassign Count a value, set Count=1, go back to step (1); if not, assign Count a value, set Count=1, go back to step (1) and continue execution, and loop through step (4).

Step (3) judging whether there is leading CAV waiting to form in the vehicle platoon formation section at this time, if so, setting the value of the vehicle counter at point A as Count=Count+1, and executing step (4) in sequence; if not, going back to step (1) and continue execution.

Step (4) judging whether the leading CAV that do not form a vehicle platoon in the vehicle platoon formation section is traveling to vehicle platoon formation completion point B, if so, the leading CAV communicates with the roadside equipment at point B, and the vehicle counter stops counting. At this time, the value of the vehicle counter Count is the number of vehicles in the current vehicle platoon, then going back to step (1).

(S4) Performing cooperative control between the CAV on a main lane and the leading CAV on the ramp, adjusting the speed of the CAV on the main lane to provide a safe merging gap for the vehicle platoon on the ramp when position of the CAV on the main lane is within the range $[M_S\text{-}v_{mainlane\_max}t_{max}, M_S\text{-}v_{mainlane\_max}t_{min}]$, where $v_{mainlane\_max}$ represents a maximum speed limit on the main lane of freeway, $M_S$ represents the distance from the start of the main lane to the merging point S.

Figure 5:
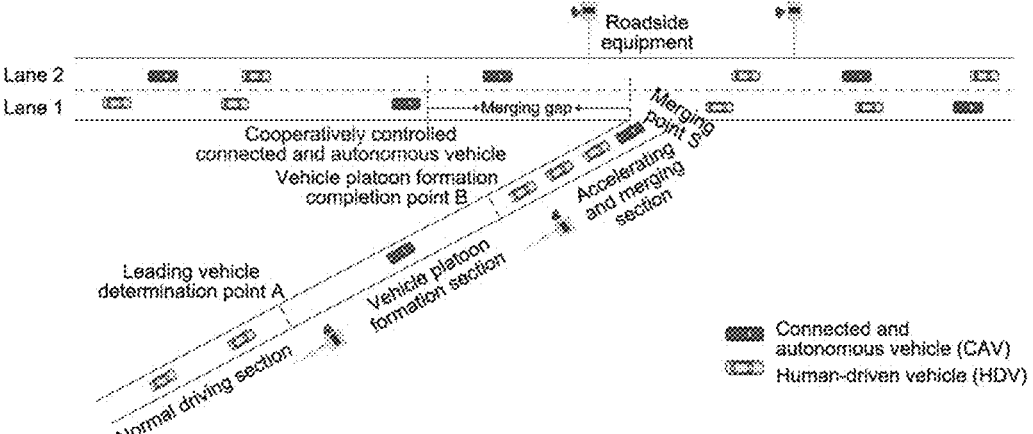
FIG. 5 schematically shows cooperative control of the CAV on the main lane according to an embodiment of the present disclosure.

For the CAV within this range, the appropriate merging gap should be reserved for vehicle platoon on the ramp. As shown in FIGS. 4-5, the cooperative control CAV on the main lane must arrive at the merging point S later than the last vehicle of the vehicle platoon on the ramp, $v_{mainlane\_cav}$ represents the speed of the cooperative control CAV on the main lane and satisfies a formula:

$$L_{mainlane\_cav} + \int_0^{t_N} v_{mainlane\_cav}(t)dt < M_S;$$

where $L_{mainlane\_cav}$ represents a position of the cooperative control CAV on the freeway main lane when the vehicle platoon is successfully formed on the ramp;

$t_N$ represents time required for the last vehicle in the vehicle platoon to travel to the merging point S when the vehicle platoon is successfully formed; and $v_{mainlane\_cav}(t)$ represents a speed of the cooperative control CAV on the main lane at the time t.

On the main lane, a distance $L_{mainlane\_cav\_followdist}$ between the cooperative control CAV and its preceding vehicle is expressed as:

$$L_{mainlane\_cav\_followdist} > (N-1)L_H + N \cdot l;$$

where N represents the number of vehicles in the vehicle platoon on the ramp;

$L_H$ represents a vehicle car-following distance within the vehicle platoon; and l represents a length of vehicles.

(S5) The vehicle platoon is allowed to accelerate and merge into the main lane.

This application, a control method of mixed traffic flow on freeway ramp based on controllable CAVs, obtains the traffic situation on the main lane and downstream merging zone of freeway in advance based on vehicle networking technology, utilizes the controllability of the CAVs, and controls the speeds of the CAVs to complete leading the vehicles on the ramp to merge into the main lane of the freeway safely, so as to avoid the situation that the drivers find the time to merge into the main lane only based on their own driving experiences and surrounding driving environment.

Described above are merely preferred embodiments of this application, which are not intended to limit the technical solutions of this application. It should be understood that various variations and replacements made by those skilled in the art without departing from the spirit and principles of the disclosure shall also fall within the scope of the disclosure defined by the appended claims.

What is claimed is:

1. A control method of mixed traffic flow on a freeway ramp based on controllable connected and autonomous vehicles (CAVs), comprising:

(S1) dividing a ramp into a normal driving section, a vehicle platoon formation section and an accelerating and merging section; and marking a leading vehicle determination point A, a vehicle platoon formation completion point B and a merging point S on the ramp;

(S2) forming a vehicle platoon consisting of a leading CAV and at least one human-driven vehicle (HDV) on the vehicle platoon formation section;

(S3) calculating a time interval $[t_{min}, t_{max}]$ for the vehicle platoon to fully reach the merging point S;

(S4) performing cooperative control between a CAV on a main lane and the leading CAV on the ramp to provide a merging gap for the vehicle platoon on the ramp; and (S5) allowing the vehicle platoon to accelerate and merge into the main lane;

wherein in step (S2), when the vehicle platoon is formed, a positional relationship between the leading CAV and an immediately-following HDV is expressed as:

$$L_A + \int_0^\tau v_{leading\_cav}(t)dt = \int_0^\tau v_{follower}(t)dt + L_H;$$

wherein $L_A$ represents a position of the leading vehicle determination point A;

$v_{leading\_cav}(t)$ represents a speed of the leading CAV at time t;

$v_{follower}(t)$ represents a speed of the immediately-following HDV at the time t; and $L_H$ represents a vehicle car-following distance within the vehicle platoon.

2. The control method of claim 1, wherein in step (S3), the time interval is calculated through steps of:

calculating a minimum speed of the leading CAV and a maximum speed of the leading CAV on the ramp; and calculating a time when the leading CAV on the ramp reaches the merging point S, and calculating a time when a last HDV of the vehicle platoon reaches the merging point S to calculate the time interval.

3. The control method of claim 2, wherein a speed of the leading CAV on the ramp satisfies the following conditions:

$$L_A + v_{min}t = v_{max}t + L_H; \text{ and } v_{min}t = L_B - L_A;$$

wherein: $v_{min}$ represents the minimum speed of vehicles on the ramp;

$v_{max}$ represents the maximum speed of the vehicles on the ramp;

$L_B$ represents a position of the vehicle platoon formation completion point B on the ramp; and t represents a travel time of the vehicles on the ramp.

4. The control method of claim 2, wherein the time when the leading CAV on the ramp reaches the merging point S is calculated according to an actual platoon formation completion point B';

case 1: when the actual vehicle platoon formation completion point B' coincides with the vehicle platoon formation completion point B marked on the ramp, the time $t_{cav\_to\_S}$ when the leading CAV on the ramp reaches the merging point S is expressed as:

$$\frac{L_S - L_B - \frac{v_{max}^2 - v_{min}^2}{2a_{cav1}}}{v_{max}} + \frac{v_{max} - v_{min}}{a_{cav1}} = t_{cav\_to\_S};$$

and case 2: when the actual vehicle platoon formation completion point B' is located between the leading vehicle determination point A and the vehicle platoon formation completion point B, the time $t_{cav\_to\_S}$ when the leading CAV reaches the merging point S is expressed as:

$$\frac{L_S - L_{Current\_LeadingCav\_Pos} - \frac{v_{max}^2 - v_{min}^2}{2a_{cav1}}}{v_{max}} + \frac{v_{max} - v_{min}}{a_{cav1}} = t_{cav\_to\_S};$$

wherein: $L_B$ represents a position of the vehicle platoon formation completion point B on the ramp;

$L_S$ represents a position of the merging point S on the ramp;

$\alpha_{cav1}$ represents an acceleration of the leading CAV; and $L_{Current\_LeadingCav\_Pos}$ represents a position of the leading CAV on the ramp when the vehicle platoon is successfully formed.

5. The control method of claim 4, wherein the time when the last HDV of the vehicle platoon reaches the merging point S is calculated based on a Newell car-following model, expressed as:

$$t_n = t_{cav\_to\_S} + \sum_{i=2}^{n}\left(\tau_n + \frac{d_n}{v_{max}}\right);$$

wherein: $\tau_n$ represents a response time of a $n^{th}$ HDV of the vehicle platoon;

$d_n$ represents a minimum following distance of the $n^{th}$ HDV of the vehicle platoon; and n represents a $n^{th}$ vehicle of the vehicle platoon, and $n \neq 1$.

6. The control method of claim 5, wherein in the time interval $[t_{main}, t_{max}]$, $t_{main}$ represents a minimum time required for the last HDV of the vehicle platoon to reach the merging point S when the vehicle platoon is successfully formed, and is calculated as:

$$t_{min} = \begin{cases} \dfrac{(N-1)(L_H + l) + L_S - L_B}{v_{max}} & (\text{case1}, L_B = L_{B'}) \\ \dfrac{(N-1)(L_H + l) + L_S - L_{B'}}{v_{max}} & (\text{case2}, L_B \neq L_{B'}) \end{cases};$$

$t_{max}$ represents a maximum time required for the last HDV of the vehicle platoon to reach the merging point S when the vehicle platoon is successfully formed, and is calculated as:

$$t_{max} = \begin{cases} \dfrac{(N-1)(L_H + l) + L_S - L_B}{v_{min}} & (\text{case1}, L_B = L_{B'}) \\ \dfrac{(N-1)(L_H + l) + L_S - L_{B'}}{v_{min}} & (\text{case2}, L_B \neq L_{B'}) \end{cases};$$

wherein: N represents the number of vehicles in the vehicle platoon on the ramp; and l represents a length of the vehicles.

7. The control method of claim 2, wherein in step (S4), when a position of the CAV on the main lane is within a range $[M_S - v_{mainlane\_max}t_{max}, M_S - v_{mainlane\_max}t_{min}]$, a speed of the CAV on the main lane is adjusted to provide a safe merging gap for the vehicle platoon on the ramp, wherein $v_{mainlane\_max}$ represents a maximum speed limit for the main lane, and $M_S$ represents a distance from a starting point of the main lane to the merging point S.

8. The control method of claim 7, wherein in step (S4), the speed $v_{mainlane\_cav}$ of the CAV on the main lane is expressed as:

$$L_{mainlane\_cav} + \int_{0}^{t_N} v_{mainlane\_cav}(t)dt < M_S;$$

wherein: $L_{mainlane\_cav}$ represents a position of the CAV on the main lane when the vehicle platoon is successfully formed on the ramp;

$t_N$ represents a time required for a last vehicle in the vehicle platoon to travel to the merging point S; and $v_{mainlane\_cav}(t)$ represents a speed of the CAV on the main lane at time t.

9. The control method of claim 7, wherein in step (S4), a distance $L_{mainlane\_cav\_followdist}$ between the CAV on the main lane and its preceding vehicle is expressed as:

$$L_{mainlane\_cav\_followdist} > (N-1)L_H + N \cdot l;$$

wherein: N represents the number of vehicles in the vehicle platoon on the ramp; and l represents a length of the vehicles.

* * * * *